2 Sheets—Sheet 1.
C. F. WOOD.
AUTOMATIC ELECTRIC WEIGHING SCALE.
No. 11,503. Reissued July 9, 1895.
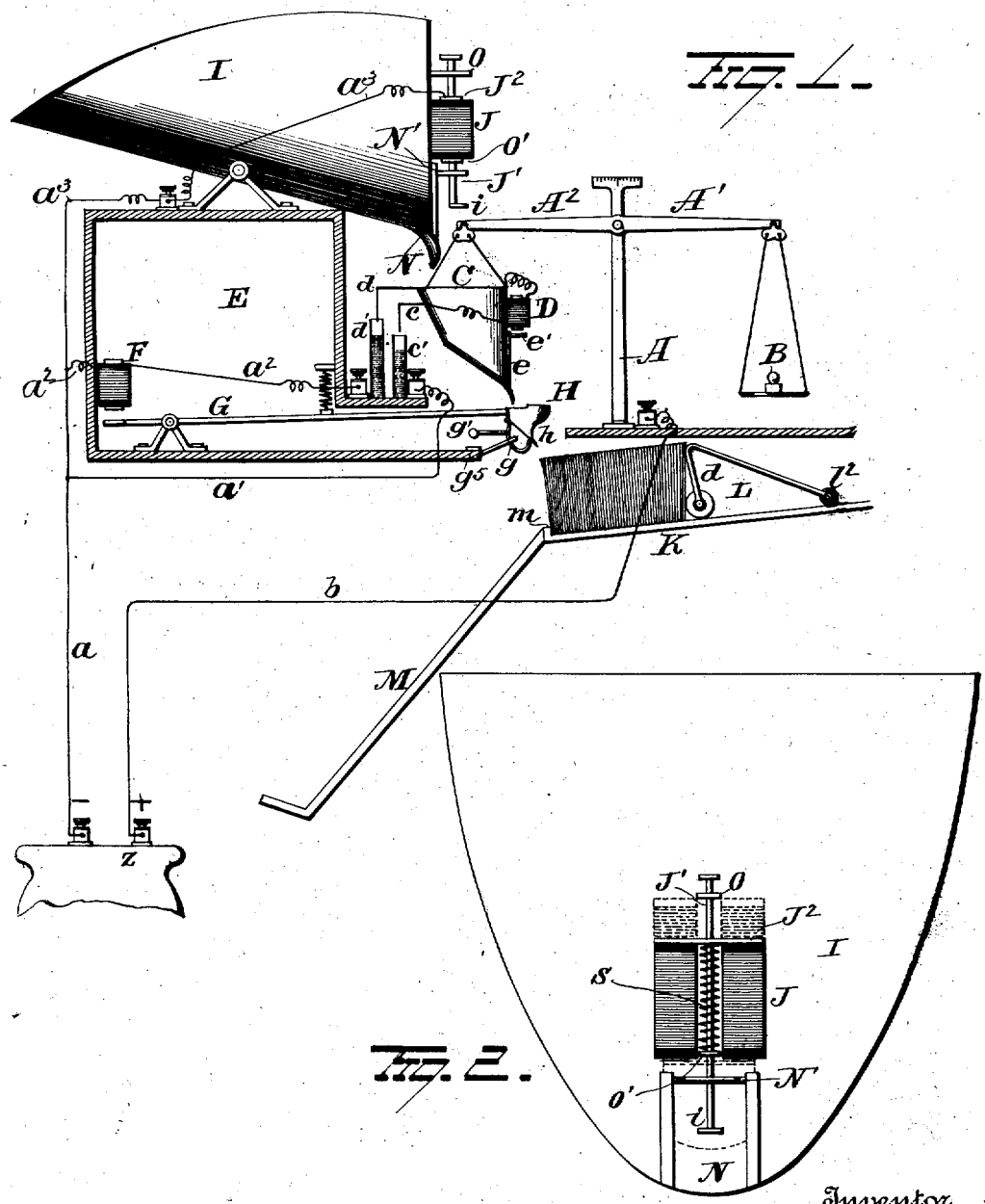
Witnesses
E. J. Nottingham
G. F. Downing
Inventor
Charles F. Wood
By H. A. Seymour
Attorney 2 Sheets—Sheet 2.

C. F. WOOD.

AUTOMATIC ELECTRIC WEIGHING SCALE.

No. 11,503. Reissued July 9, 1895.

Witnesses
E. Nottingham
G. F. Downing

Inventor
Charles F. Wood
By H. A. Seymour
Attorney

UNITED STATES PATENT OFFICE.

CHARLES F. WOOD, OF RICHMOND, VIRGINIA.

AUTOMATIC ELECTRIC WEIGHING-SCALE.

SPECIFICATION forming part of Reissued Letters Patent No. 11,503, dated July 9, 1895.

Original No. 500,045, dated June 20, 1893. Application for reissue filed January 29, 1894. Serial No. 498,403.

*To all whom it may concern:*

Be it known that I, CHARLES F. WOOD, of Richmond, in the county of Henrico and State of Virginia, have invented certain new and useful Improvements in Automatic Electric Weighing-Scales; and I do hereby declare the following to be a full, clear, and exact description of the invention, such as will enable others skilled in the art to which it pertains to make and use the same.

The object of my invention is to provide an automatic electric weighing-scale designed mainly for use in putting up in packages a small quantity of seed or other loose merchandise and to do this rapidly and accurately, giving to each package a uniform weight of material.

In seed-houses, wholesale drug-stores, and grocery-stores much time and labor are expended in putting up these small packages of seed, drugs, sample groceries, &c.; and my invention is designed to economize this time and labor, and to this end it consists in the peculiar construction and arrangement of an automatic weighing-scale which not only weighs the requisite amount and insures uniformity, but also deposits it within paper bags in a rapid and automatic manner, as hereinafter fully described.

Figure 3:
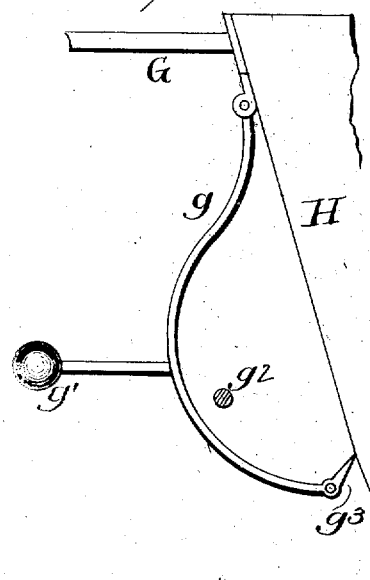
Figure 4:
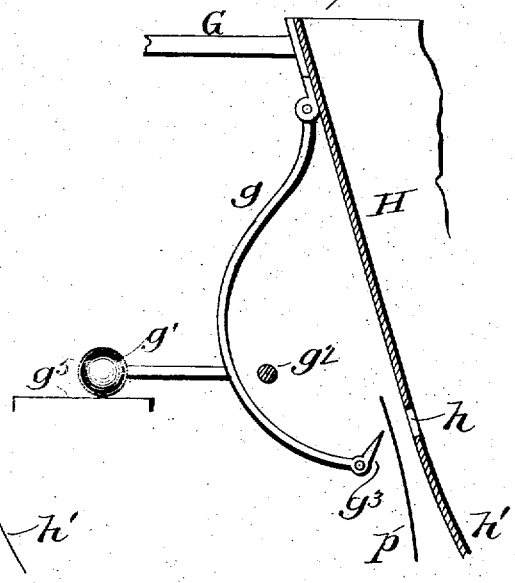
Figure 5:
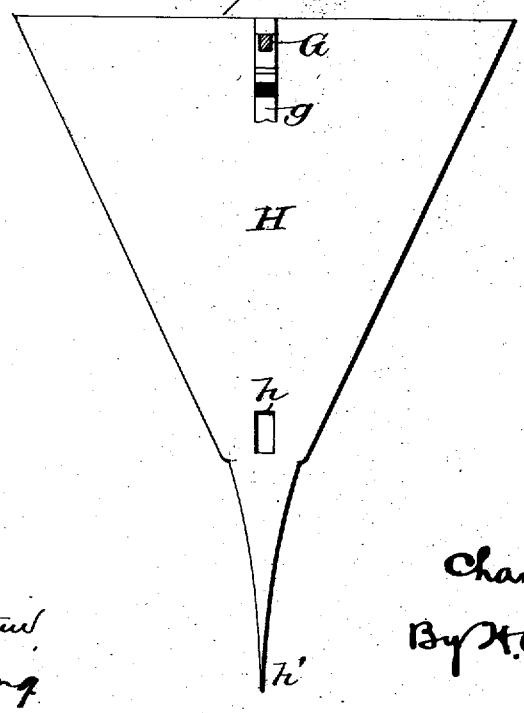

Figure 1 is a side view, partly in section, of the entire apparatus. Fig. 2 is an enlarged front view of the feed device, and Figs. 3, 4, and 5 are enlarged detail views of the bag-filling devices.

In the drawings, A represents the standard of the scales, to the upper part of which is fulcrumed the balance-beam $A' A^2$, to one end $A'$ of which is suspended a pan for the weight B, and to the other end $A^2$ of which is suspended a weighing-receptacle C for the seed or other merchandise to be weighed.

I is a reservoir-hopper mounted above the receptacle C and adapted to discharge into it, and H is a transfer-funnel adapted to receive the seed from the receptacle C and transfer the charge.

E is a box or case, upon the top of which is fulcrumed the reservoir-hopper I. This hopper I has at its lower end, next to the scales, a sliding door N, which is arranged to slide easily in vertical guideways to close the orifice at the bottom of the hopper. This door N has attached to its upper edge an armature $N'$, arranged to be attracted by the electromagnet J to raise the door and start the discharge of seed. The magnet J is rigidly connected to rod $J'$ and cross-bar $J^2$, and the rod $J'$ is arranged to slide vertically with the magnet in arms O $O'$, projecting from the end of the hopper.

Between the cross-bar $J^2$ and the projecting arm $O'$ there is disposed a spiral spring S, wound about the rod $J'$, upon which the weight of the magnet and its attached parts is sustained in sensitive equilibrium. On the lower end of the rod $J'$ is a flat head *i*, which forms a contact-face for the end $A^2$ of the balance-beam to strike against. This rod $J'$ is connected to one of the terminals of the coil of the magnet J, and the other terminal is connected through wires $a^2$ and *a* to one pole of the battery Z. The other pole of this battery is, through circuit-wire *b*, connected to insulated scale-standard A and balance-beam $A^2 A'$. Now, when a weight B is placed in the balances the end $A^2$ of the balance-beam rises to contact with the point *i*, and thus establishes an electric circuit through electromagnet J, which, attracting armature $N'$, lifts the door N and allows the seed to be discharged into the weighing-receptacle I will now describe the object of making the magnet J movable. When the seed is running out through the door into the receptacle C and as soon as the weight of the seed in receptacle C balances the weight B, the receptacle C begins to descend and breaks electrical contact between beam $A^2$ and face *i*; but as there is a stream of seed in mid-air in the act of falling through the wide-open door the seeds are dumped into receptacle C after electrical contact is broken and give a greater weight than is indicated by B. The object in making magnet J movable is to correct this difficulty and also secure other advantages. With the magnet made adjustable, as described, when the end $A^2$ of the beam rises its first effect is to establish the electric circuit through magnet J, as described; but the magnet J being held in delicate equilibrium by its spring S the further movement of beam $A^2$ upwardly lifts, through rod $J'$, the magnet J and pulls the door N farther open. Now, when the receptacle begins to settle the beam-end $A^2$ drops and with it the magnet J, armature N′, and door N are gradually lowered and the stream of falling seed is gradually reduced until only a few seed are in the act of falling at the moment of the break in electrical contact between $A^2$ and *i*, and such of these few seed as happen to be in the air at this moment do not involve any substantial increase in the weight of the charge of seed. It will also be seen that by making the magnet J movable a much greater range of movement is obtained in lifting the door than could be obtained by the limited range of the armature with a stationary magnet. Within the box E is arranged an electromagnet F and a long lever G, having at one end beneath the electromagnet F an armature and at the other the transfer-funnel H, which is rigidly attached to and supported by the same. This lever emerges through an opening in the side of the box, and the transfer-funnel H is sustained just below the outlet-door *e* of the weighing-receptacle C. This door slides vertically in guides and has at its upper edge an armature *e′*, arranged to be lifted by an electromagnet D, fixed to the side of the receptacle. After the seed are deposited in and weighed by the receptacle C they are to be deposited in the transfer-funnel H and transferred into the bag, a series of which are retained in the bag-holder K. On the receptacle C is a bent wire *d* that is arranged to dip into a mercury-column *d′*. This mercury-column is connected by wire $a^2$ to electromagnet F, and thence to circuit-wire *a*. As soon as the receptacle C descends with the load electrical contact is made between *d* and *d′*, and *d* being connected with one pole of the battery through the scales and wire *b* and *d′* with the other pole of the battery through wire $a^2$ and *a* the magnet F is charged, and, attracting the armature of lever G, lowers or throws down the transfer-funnel H, which, descending, opens the mouth of the bag, as will be described farther on. As soon as this movement is effected the door *e* of the receptacle C is opened and its contents transferred through the funnel H into the bag. To open the door *e*, I complete an electrical circuit through the magnet D immediately after the circuit is established at *d d′* through magnet F. This second circuit is established by a bent wire *c*, adapted to enter a mercury-column *c′*, the wire *c* being connected through magnet D to the scales and one pole of the battery, and the mercury-column *c′* being connected through wires *a′ a* with the other pole of the battery. Immediately after the movement of lever G (from charging magnet F through contacts *d d′*) there follows the opening of the door *e* by magnet D through the circuit established at *c c′*, the circuit being divided between the two magnets D and F. In making contact for the two circuits of the electromagnets F and D, I prefer the mercury-columns or cups, as shown, since they do not interfere with the free movement of the weighing-receptacle C; but I may employ spring-contacts, slides, or any other form of electrical contacts for this purpose.

I will now describe the bag-filling devices and their operation in connection with the features already described. K is a bag-holder arranged beneath the scales on an incline, and filled with paper bags arranged vertically and pressed forwardly by a roller L, which has an angular wire frame *l* that bears against the tops of the bags and holds them against any tendency to fall back. This frame *l* is supported at its rear end upon a roller $l^2$. At the lower end of the bag-holder the row of bags are held against falling out by a lip *m* just below the transfer-funnel. The bag being stiff stand upright at this point with the mouth immediately beneath the end of the funnel H, which in descending penetrates the mouth and expands the same preparatory to delivering the charge of seed into the same. The transfer-funnel H is made with one side extended below the other and terminating in a sharp point *h′*. (See Figs. 3, 4, and 5.) This point serves to penetrate the narrow space between the sides of the flattened or collapsed bag to open the mouth before discharging the seed into the same, and insures the delivery of the seed upon one side of this point *h′* and into the mouth of the bag. To this side of the funnel near its top is hinged a pendent bent arm *g*, having near its middle an offsetting weighted arm *g′*, and at its lower end an articulated and pointed toe $g^3$. Within the bend of the arm *g* there is a stationary bar $g^2$, supported by a portion of the framework, as in Fig. 1, and beside it and under the weight *g′* there is a rest or contact-surface $g^5$. The toe $g^3$ of the arm is jointed, so as to bend upwardly, but cannot move downwardly, and just opposite it in the funnel is an opening *h*, into which this toe is adapted to enter in seizing the bag.

The operation of the parts just described is as follows: When the transfer-funnel H descends, its point enters the mouth of the bag and the weighted arm *g′* strikes the contact-face $g^5$ and draws the arm *g* and toe $g^3$ away from the funnel, permitting the paper side *p*, Fig. 4, of the bag to pass between the funnel and the toe $g^3$. Then after the bag has been filled and the funnel rises the toe $g^3$ presses the paper into the opening *h* of the funnel, and indenting or perforating the same lifts the filled bag over the shoulder *m* until the arm *g* strikes the stationary bar $g^2$. This throws the arm and toe outwardly, and, releasing the bag, allows it with its charge of seed to drop upon the chute *m*, whence it slides to a suitable shelf below and is then sealed or closed by hand.

From the foregoing description it will be seen that the order of automatic action is as follows: First, the seed are discharged from the hopper I into the receptacle C and weighed. The receptacle C in descending first establishes the electric circuit in magnet F, throwing down transfer-funnel H and opening the bag, and immediately following the electric circuit is established in magnet D, emptying the contents of receptacle C into the transfer-funnel H and thence into the bag. Receptacle C, being thus lightened, rises, and, breaking the contacts at *c* and *d*, allows door *e* to close and transfer-hopper H to rise and lift the filled bag, which is immediately dropped, as before described, after which the same action just described is repeated.

In defining the relation of the bag-holder and the funnel H to the other features claimed in this case I would state that I do not make in this case any claim to the special construction of said bag-holder and funnel, as this has been held to be a separate subject-matter. I therefore reserve the right to cover these features in a separate application.

Having thus described my invention, what I claim, and desire to secure by Letters Patent, is—

1. The combination with a scale beam, a hopper or receptacle and a transfer hopper or funnel, of electrical devices for controlling the discharge door of said hopper or receptacle, electrical devices for controlling the transfer hopper or funnel, and two circuit closers controlled by the movements of the scale beam and included in an electric circuit with said electrical devices and a generator, substantially as set forth.

2. The combination with two receptacles, one adapted to discharge into the other, electro-magnetic devices for controlling the outlet of the upper receptacle and electro-magnetic devices for controlling the outlet of the lower receptacle, of a scale beam and two circuit closers actuated thereby and included in circuit with said electro-magnetic devices, substantially as set forth.

3. The combination with a main hopper and a scale beam, of a receiving hopper or receptacle carried by the scale beam, a transfer hopper or funnel adapted to receive material from the receiving hopper and discharge it into a bag, electro-magnetic devices for controlling the discharge of material from said hoppers or receptacles, electro-magnetic devices for controlling the operation of the transfer hopper or funnel, and means for controlling all of said electro-magnetic devices whereby to render the operation of the apparatus automatic and continuous to weigh and discharge predetermined quantities of material as long as the main hopper or receptacle is kept charged therewith, substantially as set forth.

4. In an automatic weighing device, the combination with a hopper, its gate or door and a scale beam, of an armature projecting from said gate or door, a movable electro-magnet connected to the hopper and adapted to attract said armature an electric circuit including said electro-magnet and a rod carried by said electro-magnet and adapted to be engaged by the scale beam, substantially as set forth.

5. In an automatic weighing apparatus, the combination with a hopper, its door or gate and a scale beam, of an electro-magnetic device adapted to hold said gate or door open an electric circuit including said electro-magnet, and a rod carried by the electro-magnetic device adapted to be engaged by the scale beam, whereby to control the action of said gate or door, substantially as set forth.

6. In an automatic weighing apparatus, the combination with a hopper, its gate or door and a scale beam, of an armature projecting from said gate or door, an electro-magnet, a yielding connection between said electro-magnet and the hopper, a rod carried by said electro-magnet and adapted to be engaged by the scale beam to control the operation of the gate or door and an electric circuit including said rod, scale beam and electro-magnet, substantially as set forth.

7. The combination with a main hopper, a scale beam and a weighing hopper or receptacle carried by the scale beam, of a pivoted lever, a transfer hopper carried by the pivoted lever and adapted to receive material from the weighing hopper or receptacle and discharge it into a bag and means for automatically controlling the movements of said pivoted lever, substantially as set forth.

8. The combination with a main hopper and a weighing hopper, of a pivoted lever, an armature at one end of said pivoted lever, a transfer hopper at the other end of said pivoted lever, said transfer hopper being adapted to receive material from the weighing hopper, and an electro-magnet adapted to attract said armature, whereby to cause the transfer hopper to enter a bag to discharge its contents therein, substantially as set forth.

9. The combination with a main receptacle and a transfer receptacle, of a scale beam, weighing receptacle carried by the scale beam and disposed between the main and the transfer receptacle, and electro-magnetic devices controlled by the movements of the scale beam for controlling the discharge of material from said receptacles, substantially as set forth.

10. In an electrical weighing scales, the combination with the reservoir hopper and its door, and its scale beam with its weighing receptacle, of an electro magnet with battery circuit arranged to lift the door by the contact of the scale beam, said electro magnet being made bodily movable so as to follow the scale beam up and down and lift the door by mechanical as well as electrical action, substantially as shown and described.

11. The combination of hopper I having door N with armature N′; the electro magnet J with rod J′ and cross bar $J^2$, guiding supports O, O′, supporting spring S, and the scale beam with weighing receptacle arranged to lift the electro magnet and make electrical contact as described.

12. In an electric weighing scales, the combination of the pendent weighing receptacle C having door *e* with armature *e'* and electro magnet D, and an electrical contact and battery circuit, said contact being arranged to be closed by the descent of the receptacle C to open its discharge door, as described.

13. In an electric weighing scales, the combination with the scale beam; of the hopper with discharge door N and magnet J arranged above it, the suspended weighing receptacle C with discharge door *e* and magnet D, the transfer funnel H mounted on lever G, the magnet F and the two electrical circuits and their contacts *d*, *d'* and *c*, *c'*, arranged to operate in sequence to raise the transfer funnel and discharge the contents of receptacle C therein, substantially as set forth.

14. The combination with the electrical weighing scales having movable receptacle C, and a bag holder; of a transfer funnel with supporting lever and operating magnet connected with the weighing scales and operated by its circuit, and arranged to transfer the contents of the weighing receptacle to the bag, substantially as shown and described.

15. The combination of the hopper with electrically controlled door N, the scale beam with suspended receptacle C having electrically controlled discharge door, the adjustable transfer funnel H, two electrical circuits with contacts carried by the receptacle C, one circuit being arranged to adjust the funnel and the other to control the discharge door of the weighing receptacle and bag holding and feeding devices, substantially as shown and described.

CHARLES F. WOOD.

Witnesses:
J. H. HUFFMAN,
G. F. DOWNING.